United States Patent
Chaudhry

(10) Patent No.: US 8,333,554 B2
(45) Date of Patent: Dec. 18, 2012

(54) SPLIT GEARBOX AND NACELLE ARRANGEMENT

(75) Inventor: Zaffir A. Chaudhry, South Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1097 days.

(21) Appl. No.: 11/939,725

(22) Filed: Nov. 14, 2007

(65) Prior Publication Data
US 2009/0123274 A1 May 14, 2009

(51) Int. Cl.
*F01D 15/12* (2006.01)
(52) U.S. Cl. ........................ 415/122.1; 60/802
(58) Field of Classification Search ............ 60/802
See application file for complete search history.

(56) References Cited

U.S. PATENT DOCUMENTS

| | | | |
|---|---|---|---|
| 2,978,869 A * | 4/1961 | Hiscock et al. ............... | 60/802 |
| 3,286,543 A | 11/1966 | Porter | |
| 4,121,138 A | 10/1978 | Flint et al. | |
| 4,507,915 A | 4/1985 | Evans | |
| 4,593,523 A | 6/1986 | Hawes | |
| 4,776,163 A | 10/1988 | Brockmann | |
| 5,097,658 A | 3/1992 | Klaass et al. | |
| 5,107,676 A * | 4/1992 | Hadaway et al. ............ | 60/226.1 |
| 5,309,029 A | 5/1994 | Gregory et al. | |
| 5,349,814 A | 9/1994 | Ciokajlo et al. | |
| 5,694,765 A * | 12/1997 | Hield et al. ................ | 60/39.163 |
| 5,806,805 A | 9/1998 | Elbert et al. | |
| 6,080,074 A | 6/2000 | Ulbrich et al. | |
| 6,158,210 A | 12/2000 | Orlando | |
| 6,467,725 B1 | 10/2002 | Coles et al. | |
| 6,672,049 B2 | 1/2004 | Franchet et al. | |
| 6,825,640 B1 | 11/2004 | Hill et al. | |
| 7,168,913 B2 * | 1/2007 | Lardellier ................ | 415/122.1 |
| 7,552,591 B2 * | 6/2009 | Bart et al. ................ | 60/802 |
| 2007/0157597 A1 | 7/2007 | Sharp | |

FOREIGN PATENT DOCUMENTS

| | | | |
|---|---|---|---|
| EP | 2085589 A2 * | 8/2009 | |
| WO | 95 02120 | 1/1995 | |
| WO | 2005 005810 | 1/2005 | |

OTHER PUBLICATIONS

European Search Report for EP Application No. 08253726.7, Feb. 20, 2012.

* cited by examiner

*Primary Examiner* — Richard Edgar
(74) *Attorney, Agent, or Firm* — Carlson, Gaskey & Olds, P.C.

(57) ABSTRACT

A gas turbine engine is disclosed that includes at least first and second gearboxes rotationally coupled to at least one spool. Accessory drive components are mounted on and driven by the gearboxes. The accessory drive components include, for example, a fuel pump, a hydraulic pump, a generator, a lubrication pump, or a starter. The accessory drive components are split between the two gearboxes to reduce the diameter of the nacelle adjacent to each gearbox.

12 Claims, 1 Drawing Sheet

SPLIT GEARBOX AND NACELLE ARRANGEMENT

BACKGROUND

This disclosure relates to a gas turbine gearbox arrangement that is used to support and rotationally drive accessory drive components, such as a fuel pump, hydraulic pump, generator, lubrication pump and/or starter.

Gas turbine engines for commercial aircraft applications typically include an engine core housed within a core nacelle. In one type of arrangement known as a turbofan engine, the core drives a large fan upstream from the core that provides airflow into the core. One or more spools are arranged within the core, and a gear train may be provided between one of the spools and the fan. A fan case and nacelle surround the fan and at least a portion of the core.

An inlet of the fan nacelle is designed to avoid flow separation. At cruise conditions, a thinner inlet lip is desired to minimize drag and increase fuel economy. The nacelles are sized to accommodate the widest section of engine, which is often dictated by the size of a single accessory drive gearbox. The accessory drive gearbox, which is driven by a spool through a radial tower shaft and angle gearbox, is typically contained within either the fan nacelle or the core nacelle. A fuel pump, hydraulic pump, generator, lubrication pump, starter and numerous other components are typically mounted to the same accessory drive gearbox, which takes up significant space. As a result, the diameter of the nacelle housing the accessory drive gearbox and accessory components must be increased beyond a desired size. The larger diameter nacelle results in a thicker inlet lip thereby increasing drag at cruise conditions. Increased nacelle diameter also increases weight and fuel consumption. What is needed is a gas turbine engine design with a reduced diameter nacelle.

SUMMARY

A gas turbine engine is disclosed that includes first and second gearboxes rotationally coupled to at least one spool. Accessory drive components are mounted on and driven by the gearboxes. The accessory drive components include, for example, a fuel pump, a hydraulic pump, a generator, a lubrication pump, or a starter. The accessory drive components are split between the two gearboxes to reduce the diameter of the nacelle adjacent to each gearbox, enabling the design of slimmer nacelles and more efficient engines. Each gearbox may be housed within a different nacelle, or the gearbox may be housed within the same nacelle.

These and other features of the disclosure can be best understood from the following specification and drawings, the following of which is a brief description.

DETAILED DESCRIPTION

Figure 1:
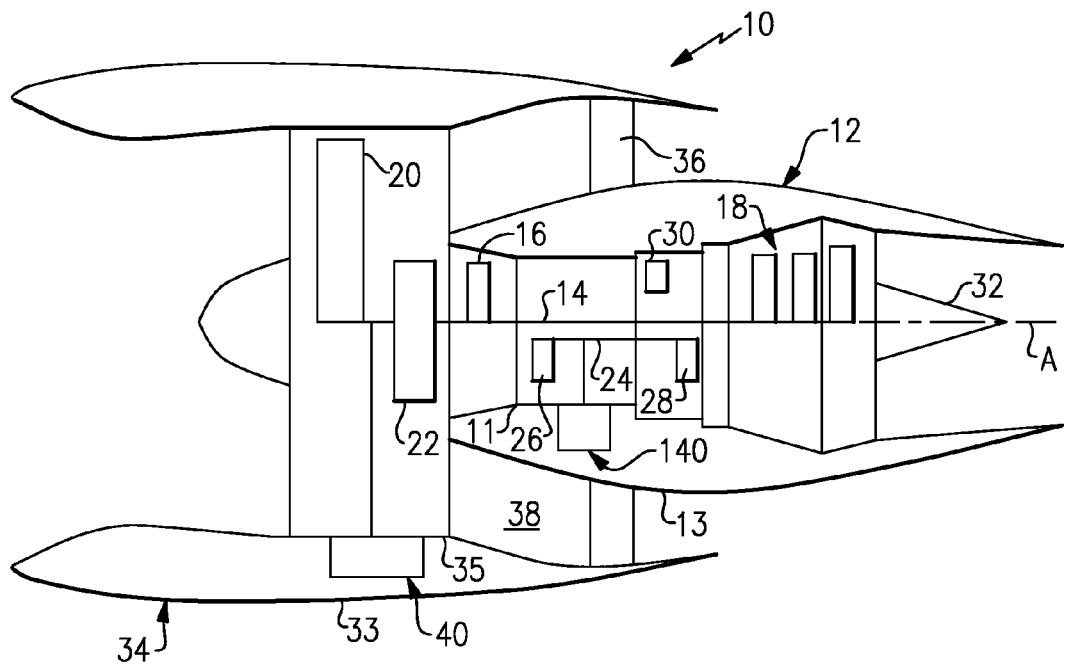
FIG. 1 is a highly schematic view of a turbofan gas turbine engine.

An engine 10 with geared architecture is shown in FIG. 1. A pylon secures the engine 10 to an aircraft. The engine 10 includes a core nacelle 12 that surrounds a low spool 14 and high spool 24 that are rotatable about a common axis A. The low spool 14 supports a low pressure compressor 16 and low pressure turbine 18. In the example, the low spool 14 drives a fan 20 through a gear train 22. The high spool 24 supports a high pressure compressor 26 and high pressure turbine 28. A combustor 30 is arranged between the high pressure compressor 26 and high pressure turbine 28. Compressed air from compressors 16, 26 mixes with fuel from the combustor 30 and is expanded in turbines 18, 28.

In the example shown, the engine 10 is a high bypass turbofan arrangement. In one example, the bypass ratio is greater than 10, and the turbofan diameter is substantially larger than the diameter of the low pressure compressor 16. The low pressure turbine 18 has a pressure ratio that is greater than 5:1, in one example. The gear train 22 is an epicycle gear train, for example, a star gear train, providing a gear reduction ratio of greater than 2.5:1. It should be understood, however, that the above parameters are only exemplary of a contemplated geared architecture engine. That is, the invention is applicable to other engines including direct drive turbofans.

Airflow enters a fan nacelle 34, which surrounds the core nacelle 12 and fan 20. The fan 20 directs air into the core nacelle 12, which is used to drive the turbines 18, 28, as is known in the art. Turbine exhaust exits the core nacelle 12 once it has been expanded in the turbines 18, 28, in a passage provided between the core nacelle 12 and a tail cone 32.

A core housing 11 is arranged within the core nacelle 12 and is supported within the fan nacelle 34 by structure 36, such as flow exit guide vanes, extending radially inwardly from a fan case 35. A generally annular bypass flow path 38 is arranged between the core and fan nacelles 12, 34. The examples illustrated in the Figures depict a high bypass flow arrangement in which approximately eighty percent of the airflow entering the fan nacelle 34 bypasses the core nacelle 12. The bypass flow within the bypass flow path 38 exits the fan nacelle 34 through a fan nozzle exit area at the aft of the fan nacelle 34.

In the example shown in FIG. 1, at least two accessory drive gearboxes 40, 140 are used to drive accessory components at different location within the engine. Instead of the single accessory drive gearbox typically used, the work can be split between the gearboxes 40, 140 to reduce the size of each gearbox and, thus, the size of the associated nacelle. Example accessory drive components are: a fuel pump 42, hydraulic pump 44, generator 46, lubrication pump 48 and other accessory drive components 53.

In one example, one accessory drive gearbox 40 is arranged in a radial space between the fan case 35 and an exterior surface 33 of the fan nacelle 34. The other accessory drive gearbox 140 is arranged in a radial space between the core housing 11 and an exterior surface 13 of the core nacelle 12. Both accessory drive gearboxes 40, 140 can be housed within the same nacelle, if desired. The accessory drive gearboxes are axially and radially spaced from one another, which enables desired packaging of the gearboxes.

Figure 2A:
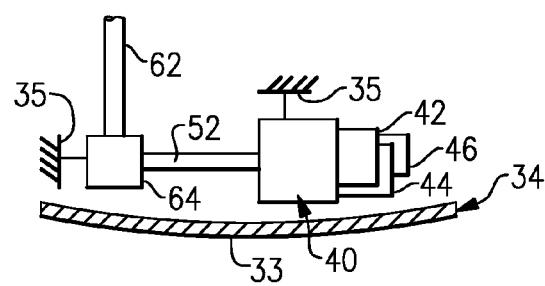
FIG. 2a is a schematic view of a first accessory drive gearbox associated with the engine shown in FIG. 1.

Referring to FIGS. 1 and 2a, the accessory drive gearbox 40 is driven by the low spool 14. The low spool 14 is coupled to a tower shaft 62 with bevel gears, as is known. The tower shaft 62 drives an input shaft 52 through an angle gearbox 64, which is mounted to the fan case 35, for example. The accessory drive gearbox 40 is supported by the fan case 35, and receives rotational drive from the input shaft 52. The accessory components shown mounted on the accessory drive gearboxes 40, 140 are exemplary only and may be different than depicted in the Figures. The accessory components for each gearbox are selected, for example, based upon packaging considerations and the desired rotational speed of the accessory component. In the example shown in FIG. 1, the accessory drive gearboxes 40, 140 are respectively driven by the low and high spools 14, 24 to provide the desired rotational speed to accessory drive components associated with the gearboxes.

Figure 2B:
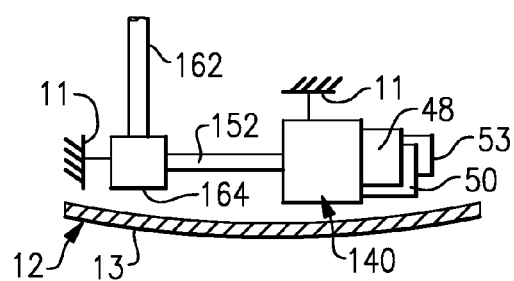
FIG. 2b is a schematic view of a second accessory drive gearbox associated with the engine shown in FIG. 1.

Referring to FIG. 2b, the accessory drive gearbox 140 is driven by the high spool 24. The high spool 24 is coupled to a tower shaft 162 with bevel gears. The tower shaft 162 drives an input shaft 152 through an angle gearbox 164, which is mounted to the core housing 11, for example. The accessory drive gearbox 140 is supported by the core housing 11, and receives rotational drive from the input shaft 152.

Although an example embodiment has been disclosed, a worker of ordinary skill in this art would recognize that certain modifications would come within the scope of the claims. For that reason, the following claims should be studied to determine their true scope and content.

What is claimed is:

1. A turbine engine comprising:
    core and fan nacelles respectively providing first and second radial spaces;
    first and second gearboxes rotationally coupled to at least one spool;
    accessory drive components including at least two of a fuel pump, a generator, a lubrication pump, or a starter; and
    wherein one of the accessory components is mounted to the first gearbox, and another of the accessory components is mounted to the second gearbox, wherein the first and second gearboxes respectively are arranged within the first and second radial spaces.

2. The turbine engine according to claim 1, wherein the core nacelle surrounding the at least one spool, the fan nacelle surrounding the core nacelle to provide a bypass flow path between the nacelles.

3. The turbine engine according to claim 2, comprising a fan case surrounding a fan that is arranged upstream from the core nacelle, and a core housing arranged about the at least one spool, the gearboxes supported by at least one of the fan case and the core housing.

4. The turbine engine according to claim 3, wherein the core nacelle is arranged radially outwardly of the core housing providing the first radial space there between, and the fan nacelle is arranged radially outwardly of fan case providing the second radial space there between.

5. The turbine engine according to claim 4, wherein the core and fan nacelles each include exterior surfaces, the gearboxes and their respective accessory drive components contained radially within the exterior surfaces.

6. The turbine engine according to claim 1, wherein the at least one spool includes low and high spools rotatable about a common axis, and the first and second gearboxes are rotationally coupled to the low and high spools, respectively.

7. The turbine engine according to claim 1, wherein the first and second gearboxes are axially spaced from one another.

8. The turbine engine according to claim 1, wherein at least one of the gearboxes is coupled to the at least one spool by a tower shaft, angle box and input shaft, the angle box interconnected between the tower and input shafts, and the other of the gearboxes couple to the other spool by another shaft that is non-coaxial with the tower and input shafts.

9. A turbine engine comprising:
    a two spool arrangement having only low and high spools;
    a fan operatively coupled to the low spool by an epicyclic gear train;
    first and second gearboxes respectively rotationally coupled to the low and high spools; and
    a core nacelle surrounding the low and high spools and surrounded by a fan nacelle that houses the fan, the core and fan nacelles each housing one of the first and second gearboxes.

10. The turbine engine according to claim 9, comprising accessory drive components including at least two of a fuel pump, a hydraulic pump, a generator, a lubrication pump, or a starter, wherein at least one the accessory components is mounted to the first gearbox, and another of the accessory components is mounted to the second gearbox.

11. The turbine engine according to claim 10, wherein the first gearbox is contained between a core housing and an exterior surface of the core nacelle, and the second gearbox is contained between a fan case an exterior surface of the fan nacelle, the first and second gearboxes coupled to the first and second spools by separate non-coaxial shafts.

12. A turbine engine comprising:
    first and second gearboxes rotationally coupled to at least one spool;
    accessory drive components including at least two of a fuel pump, a hydraulic pump, a generator, a lubrication pump, or a starter;
    wherein one of the accessory components is mounted to the first gearbox, and another of the accessory components is mounted to the second gearbox; and
    core and fan nacelles respectively providing first and second radial spaces, one of the first and second gearboxes arranged within the first radial space, and the other of the first and second gearboxes arranged within the second radial space.

* * * * *